Feb. 21, 1939.  S. L. GOLDBERG  2,148,018
PHOTOCOPYING MACHINE
Filed Dec. 7, 1937

SOLOMON L. GOLDBERG
INVENTOR

BY John P. Nixonov
ATTORNEY

UNITED STATES PATENT OFFICE 2,148,018

PHOTOCOPYING MACHINE

Solomon L. Goldberg, New York, N. Y.

Application December 7, 1937, Serial No. 178,468

4 Claims. (Cl. 88—24)

My invention relates to photocopying machines and has particular reference to machines for making photographic copies of drawings, documents etc.

My invention has for its object to provide a simple and inexpensive machine for making photographic reproductions or photostats. Ordinary machines for making photostats are very large, complicated and expensive, mainly because they are provided with accurate focusing arrangement in order to obtain any desired reduction or enlargement within wide pratical limits and from relatively large drawings. In a large number of cases, however, it is necessary to make reproductions on the same scale as the originals, as, for instance, in copying documents and legal papers, pages of books, illustrations, small drawings and diagrams, photographs etc., or to make one standardized reduction, as, for instance, reproducing double pages or pages of large books. My photo copying machine or camera is designed to meet these requirements by providing a simple and compact device with but two simple adjustments for making photostats without any reduction or with a certain definite practical reduction. For this purpose I provide an objective lens mounting telescopically or slidably fitted in a tubular holder in the camera in such manner that an object placed on a table under the lenses is projected on a sheet of light sensitive paper or film in the camera without any enlargement when the lens mounting is moved all way in, the table being supported at a proper distance. By resetting the table to a new position, determined by the table supporting devices, and by fully withdrawing the lens mounting, the camera is reset for a certain definite reduction of the image or object.

Another object of my invention is to provide a photo copying apparatus or camera in which all the operations with the light sensitive paper or film can be performed in full daylight. For this purpose I provide the camera with one or more flexible sleeves extending from apertures in the walls of the camera and adapted to enclose the operator's arm when the latter is inserted into the camera through the aperture. In the camera I provide a container for sheets of light-sensitive paper or film, from which container one paper is taken at a time and placed in a frame at the back of the camera for exposure to the projected image. The same sleeve is used upon completion of the printing operation for removing the exposed paper and placing it in a light proof container or box which can be removed from the machine when sufficient number of sheets is accumulated.

Another object of my invention is to provide an improved container or case for light-sensitive paper in combination with a printing frame so that all the operations can be performed through a single aperture in the camera.

Still another object of my invention is to provide simple and inexpensive arrangement for illuminating objects on the table under the objective lens by ordinary electric lamps with suitable reflectors.

My invention is more fully described in the accompanying specification and drawing in which—

Figure 1:
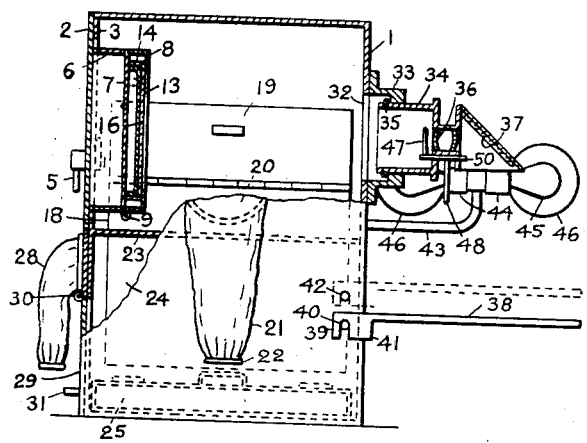
Fig. 1 is a sectional elevation of my photo copying camera.

My photocopying machine comprises a housing or camera 1 with an opening in the rear wall closed by a cover 2 drawn tightly against flanges 3 by latches 4 with handles 5. The cover has a case or box 6 for light-sensitive paper or films used for making photostat copies. A hinged cover 7 is provided in the upper portion of the case 6. A frame 8 is hingely connected at 9 to the case 6 and is held in a vertical position by resilient lugs 10 engaging notches 11 in the sides of the frame. The frame has an opening 12 in the front side for a glass plate 13 clamped to the frame by an inner bezel 14. A sheet of a light-sensitive paper is supported against the glass by a cover 16 hinged to the bezel at 17. A supplementary case 18 for the light-sensitive paper is supported at the side wall of the camera and has an opening in the upper portion with a hinged cover 19. An aperture 20 is provided in the other side wall and has a sleeve 21 made of a dark cloth and provided with an elastic band 22 at the end for an operator's hand. A horizontal partition 23 is provided under the case 6 forming a lower chamber 24 for a box 25 with a cover 26 adapted to receive paper sheets or films after exposure. An aperture 27 is provided in the rear wall under the partition 23 and has a sleeve 28 made of a dark cloth and equipped with an elastic band for an operator's hand. A cover 29 is hinged at 30 to the rear wall and has a handle 31 for its opening.

An opening 32 is provided in the front wall of the camera for a tubular extension 33 in which slides a tubular lens mounting or holder 34. A ring 35 prevents the withdrawal of the tube 34. Objective lenses 36 are fitted in the front portion of the tube 34 in conjunction with a 45° mirror 37. A shutter 47 is mounted on a shaft 50 with a handle 48.

Figure 2:
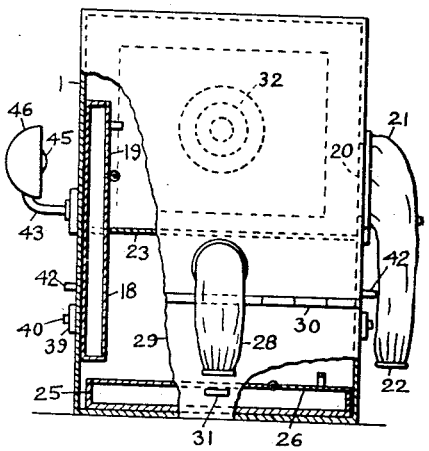
Fig. 2 is a side view of the same partly in section.
Figure 3:
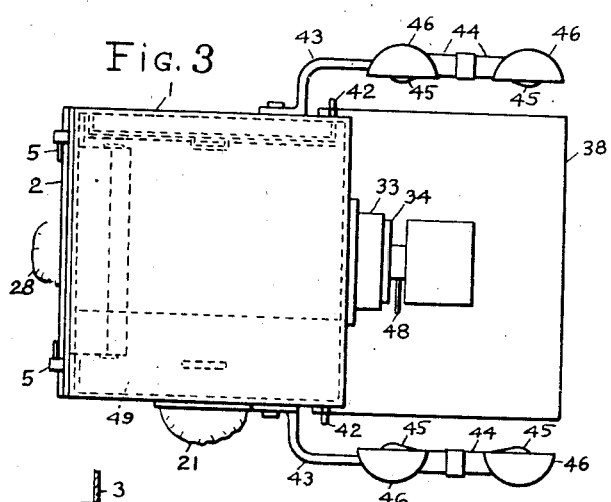
Fig. 3 is a top plan view of the same.

A table 38 is positioned under the mirror for objects to be photographed or from which photostats are to be made. The table has hooks 39 at the sides slidably engaging pins 40 on the side walls of the camera, a lug 41 retaining the table in the horizontal position. The relative distances of the table from the mirror and of the lenses from the glass plate with sensitive paper are selected so that with the lens fully withdrawn as shown in Fig. 1, when the ring 35 rests against the inner shoulder of the tubular extension 33, the camera is properly focused for reproducing originals with a certain reduction. A full size reproduction is obtained when the lens tube 34 is moved all way in as shown in Fig. 2, the table being then placed on a second set of pins 42. Brackets 43 are attached to the sides of the camera and support sockets 44 for electric lamps 45. Reflectors 46 are fitted over the sockets and can be turned in a vertical plane for directing the light on the table.

The operation of my machine is as follows.

Figure 5:
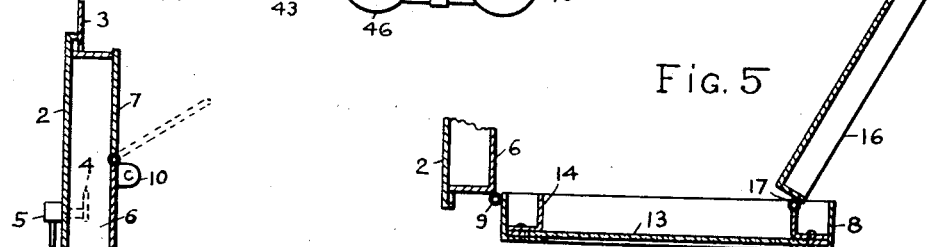
Fig. 5 is a similar view of the printing frame with the cover opened and ready to receive a sheet of paper.
Figure 4:
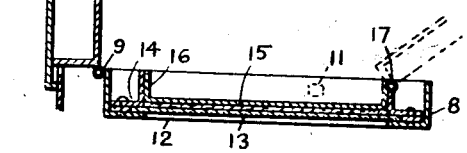
Fig. 4 is a detail view of a printing frame and case for light sensitive paper.

An object to be photographed is placed on the table 38 and the latter is fitted on the hooks or pins 40 or 41, depending on whether it is desired to obtain a reduced or full size print, the lens holder 34 being accordingly moved out or in. The operator then inserts his arm into the flexible sleeve 21 and opens the cover or frame 8, placing it in the position shown in Fig. 4. The cover 16 is then removed and turned to the right as shown in Fig. 5 exposing the glass plate 13. The cover 7 is then opened as shown in dotted lines in Fig. 4 and a sheet of light-sensitive paper is withdrawn from the case 6 and placed on the glass plate 13. The cover 7 is closed, paper is clamped by the cover 16, and the frame 8 is turned over into the vertical position in which it is clamped or held by the resilient lugs 10.

The operator then withdraws his arm from the sleeve 21 and opens the shutter 47 by turning the handle 48 for a required period of time. Upon completion of the exposure the operator again inserts his arm in the sleeve 21 and removes the exposed paper from the frame 8. He then opens the cover 26 on the box 25 and places the exposed paper in the box through the opening 49, closing the cover 26. The printing operations may be continued until the supply of paper in the case 6 is exhausted. The box 25 can be then withdrawn from the camera and taken into a dark room for developing and fixing the latent images.

The second sleeve 28 can be used for handling the exposed paper in the box 25, but this sleeve may be dispensed with if the apparatus is so proportioned that all the operations can be performed through the sleeve 21. The extra or additional case 18 is provided with an additional supply of paper. This case may be also dispensed with or, if desired, it may be used in place of the case 6 on the rear cover 2.

My apparatus is especially suitable for copying documents, letters, contracts, drawings, pages from books etc.

The arrangement of individually adjustable lamps at four corners of the table has a distinct advantage in providing a uniform illumination of an object on the table from all sides thereby avoiding shadows.

I claim as my invention:

1. A photo-copying machine comprising a camera, a cover at the rear wall of the camera, a container for sheets of a light-sensitive material mounted on the inner side of the cover, a frame with a glass plate hingedly supported on the container, means to clamp a sheet of the light-sensitive material against the glass plate, means to releasably hold the frame with the light-sensitive sheet against the container, means to direct an image of an object to be copied on the glass plate, and a cloth sleeve extending from an aperture in the wall of the camera for an operator's arm, the container and the hinged frame being accessible to the operator's hand in the sleeve.

2. A photo-copying machine comprising a camera, a cover removably closing an opening in the rear wall of the camera, a container for sheets of a light-sensitive material mounted on the inner side of the cover, a closure for the container, a frame hingedly supported on the lower portion of the container, a glass plate in the frame, means to clamp a light-sensitive sheet against the glass, means to releasably hold the frame with the light-sensitive sheet against the container, means to project an image of an object to be copied on the glass plate, and a cloth sleeve extending from an aperture in the side wall of the camera for an operator's arm, the container and the frame being accessible to the operator's hand in the sleeve.

3. A photo-copying machine comprising a camera, a cover removably closing an opening in the upper portion of the rear wall of the camera, a glass plate, means to hingedly support the glass plate on the inside of the cover, means to clamp a sheet of a light-sensitive material against the glass, means to project an image of an object on the light-sensitive sheet on the glass, a container for light-sensitive sheets in the camera between the cover and the glass plate, a horizontal partition in the camera under the glass plate with an opening for the exposed sheets, a container for light-sensitive sheets exposed to images, and a cloth sleeve extending from an aperture in the side wall of the camera for an operator's arm, the containers and the glass plate being disposed in the camera within reach of the operator's hand in the sleeve.

4. A photo-copying machine comprising a camera, a cover removably closing an opening in the upper portion of the rear wall of the camera, a glass plate, means to hingedly support the glass plate on the inside of the cover, means to clamp a sheet of a light-sensitive material against the glass, means to project an image of an object on the light-sensitive sheet on the glass, a container for light-sensitive sheets in the camera between the cover and the glass plate, a horizontal partition in the camera under the glass plate with an opening for the exposed sheets, a removable container for the exposed sheets under the partition, and a cloth sleeve extending from an aperture in the side wall of the camera for an operator's arm, the container and the glass plate being disposed in the camera within reach of the operator's hand in the sleeve.

SOLOMON L. GOLDBERG.